United States Patent
Holzinger et al.

(10) Patent No.: US 11,015,724 B2
(45) Date of Patent: May 25, 2021

(54) FLUID HOUSING FOR A FLUID COLLECTION OR FLUID DISTRIBUTION SYSTEM AND FLUID COLLECTION OR FLUID DISTRIBUTION SYSTEM

(71) Applicant: Buerkert Werke GmbH & Co. KG, Ingelfingen (DE)

(72) Inventors: Simone Holzinger, Ingelfingen (DE); Philipp Keilbach, Ingelfingen (DE); Laurenz Wick, Ingelfingen (DE)

(73) Assignee: BUERKERT WERKE GMBH & CO. KG, Ingelfingen (DE)

( * ) Notice: Subject to any disclaimer, the term of this patent is extended or adjusted under 35 U.S.C. 154(b) by 90 days.

(21) Appl. No.: 16/361,394

(22) Filed: Mar. 22, 2019

(65) Prior Publication Data
US 2019/0293190 A1    Sep. 26, 2019

(30) Foreign Application Priority Data

Mar. 22, 2018   (DE) .......................... 102018106835.2

(51) Int. Cl.
*F16K 11/10*   (2006.01)
*F15B 13/08*   (2006.01)

(52) U.S. Cl.
CPC ............ *F16K 11/10* (2013.01); *F15B 13/085* (2013.01)

(58) Field of Classification Search
CPC .............................. F16K 11/10; F15B 13/085
See application file for complete search history.

(56) References Cited

U.S. PATENT DOCUMENTS

| | | | |
|---|---|---|---|
| 6,173,731 B1 | 1/2001 | Ottliczky | |
| 6,745,793 B2* | 6/2004 | Rudle | F15B 13/081 137/596.16 |
| 6,892,764 B2 | 5/2005 | Rodrigues et al. | |
| 7,849,881 B2* | 12/2010 | Lee et al. | F15B 13/0889 137/884 |
| 9,423,039 B2* | 8/2016 | Divisi | F16K 11/10 |
| 2002/0166899 A1 | 11/2002 | Van Der Steur | |
| 2013/0269791 A1 | 10/2013 | Herrmann et al. | |
| 2015/0267720 A1* | 9/2015 | Huang etal | F16K 11/10 137/484.2 |

FOREIGN PATENT DOCUMENTS

| | | |
|---|---|---|
| DE | 202006015673 U1 | 2/2007 |
| DE | 60211474 T2 | 5/2007 |
| DE | 202012003844 U1 | 5/2012 |
| DE | 102016217506 A1 | 3/2018 |
| EP | 0952359 A1 | 10/1999 |
| EP | 1361382 A2 | 11/2003 |

* cited by examiner

*Primary Examiner* — Kevin L Lee
(74) *Attorney, Agent, or Firm* — Dilworth IP, LLC

(57) ABSTRACT

A fluid housing for a fluid collection system or a fluid distribution system is described, which comprises at least two fluid housing modules adjoining one another along an alignment direction. On each fluid housing module at least one fluid connection is provided, which is connected fluidically to a first central fluid duct via a respectively assigned lateral fluid duct. In addition, on each of the fluid housing modules at least two contact surfaces are provided, which protrude with respect to an assigned fluid housing module basic body along the alignment direction. Adjacent fluid housing modules are positioned in relation to one another via the contact surfaces. Furthermore, a fluid collection system or a fluid distribution system with such a fluid housing is presented.

19 Claims, 5 Drawing Sheets

FLUID HOUSING FOR A FLUID COLLECTION OR FLUID DISTRIBUTION SYSTEM AND FLUID COLLECTION OR FLUID DISTRIBUTION SYSTEM

FIELD OF THE INVENTION

Detailed Description The invention relates to a fluid housing for a fluid system, i.e. a fluid collection or fluid distribution system, with at least two fluid housing modules adjoining one another along an alignment direction and with a first central fluid duct, which extends substantially along the alignment direction and is formed by first central fluid duct sections of the adjoining fluid housing modules, wherein on each fluid housing module at least one fluid connection is provided, which is connected fluidically to the first central fluid duct via a respectively assigned lateral fluid duct.

The invention also relates to a fluid system, i.e. a fluid collection or fluid distribution system with such a fluid housing.

BACKGROUND

A fluid housing refers here to the housing of a valve mechanism in the broadest sense, through which fluid is conducted. In particular, the fluid housing is therefore to be distinguished from a drive housing and a control housing.

A fluid collection system is to be understood in this context to the effect that the fluid connections are fluid inlets and fluid fed into the fluid housing via these is collected in the central fluid duct and supplied to an application. The central fluid duct is then a fluid collection duct.

By a fluid distribution system, on the other hand, is meant a system that is supplied with fluid via the central fluid duct. The fluid connections are then fluid outlets, which are each connected fluidically to an associated application. The central fluid duct is a fluid distribution duct in this case.

Both fluid collection systems of this kind and fluid distribution systems of this kind are known from the prior art. For example, fluid collection systems according to the above definition are used in the field of varnishing facilities. Here different varnishing fluids, which differ in respect of their colour, for example, are fed into the fluid housing via the fluid connections and then supplied via the central fluid duct to an atomiser or another application device. Fluid collection systems of this kind are likewise used in the field of food production, detergent production and fertilizer manufacture. In these application fields, different product components are supplied to the fluid collection system via the fluid connections and then mixed in the central fluid duct or a device connected downstream thereof.

Regardless of whether a fluid collection system or a fluid distribution system is involved, the adjoining fluid housing modules in known fluid housings are frequently manufactured from a plastic.

The connecting sides of adjacent fluid housing modules, which sides fit closely together, must on the one hand fulfil the task of connecting the central fluid duct sections forming the central fluid duct to one another in such a way that the central fluid duct is reliably sealed with respect to an environment. On the other hand, the fluid housing modules must be positioned and/or aligned against one another via the connecting sides. This is necessary, since the aim is generally to arrange the individual fluid housing modules substantially along a straight line. Only thus can tight installation space specifications be met. Moreover, the individual fluid housing modules are often fixed on a rail or another fixed attachment element. This also is only possible if the individual fluid housing modules are not twisted, offset or displaced in relation to one another.

The above-named functions of the connecting sides make it necessary to manufacture these with high precision. Fine machining of the individual fluid housing modules following preceding coarse machining must generally take place for this.

The object of the invention is to specify a fluid housing and associated fluid collection or fluid distribution systems, the manufacture of which is simplified compared with the prior art. At the same time, the existing requirements regarding the tightness of the central fluid duct with respect to the environment and regarding the precise positioning of the individual fluid housing modules in relation to one another are to be fulfilled at least to the same extent as in the case of known fluid housings.

SUMMARY

The present invention provides a fluid housing of the type named at the beginning, in which on each of the fluid housing modules at least two contact surfaces are provided, which protrude with respect to an assigned fluid housing module basic body along the alignment direction and in which adjacent fluid housing modules are positioned in relation to one another via the contact surfaces. Thus in contrast to known fluid housings, adjacent fluid housing modules fit together with one another not with their entire side surfaces, thus in particular not extensively, but only via the contact surfaces, the cumulative surface area of which is comparatively small compared to a surface formed by a connecting side of a fluid housing module. It can optionally be provided that the fluid housing modules fit together additionally via a sealing component. In order to position adjacent fluid housing modules precisely in relation to one another, therefore, only the contact surfaces have to be manufactured with high precision. The same applies with regard to the tightness of the central fluid duct with respect to an environment, which can be guaranteed in a reliable and simple manner by a high precision of the contact surfaces.

A fluid housing is known from DE 10 2016 217 506 A1 with several cuboid fluid housing modules which fit together in an alignment direction. Adjoining the last fluid housing module is a separate, differently formed end part, on which connection openings are present. These end parts are not fluid housing modules and have no lateral fluid ducts.

The contact surfaces protrude by 0.1 mm to 0.5 mm, for example, preferably by 0.2 mm to 0.3 mm, with respect to the fluid housing module basic body.

The fluid housing modules of a fluid housing according to the invention can be manufactured initially adhering to comparatively rough tolerances. In a subsequent fine machining step only the contact surfaces then have to be machined adhering to close tolerances. This is simpler and more cost-effective than manufacturing the entire fluid housing modules adhering to close tolerances. At the same time, a manufacturing method of this kind is also more efficient than subjecting a complete connecting side of the fluid housing module to a fine machining step, such as is known from the prior art. It is of course also possible to omit the above-named fine machining step. The fluid housing modules of a fluid housing according to the invention are then manufactured so that the contact surfaces adhere to the stipulated close tolerances following manufacture. The other components of the fluid housing modules can have rougher tolerances. Adherence to the close tolerances on the contact surfaces can be achieved by a tool that can be correspondingly finely adjusted or likewise satisfies close tolerances at the points corresponding to the contact surfaces. As a result, fluid housings can therefore be manufactured the fluid housing modules of which are positioned precisely in relation to one another and the central fluid duct of which is reliably sealed with respect to an environment. Furthermore, dead spaces inside the fluid housing in which fluid can settle, especially in the region of the central fluid duct, which can cause contamination in the event of a fluid change, are avoided.

The fluid housing is composed of 2 to 45 fluid housing modules, for example. In particular, the fluid housing comprises 4 to 36 fluid housing modules. In this context variants with 8 to 24 fluid housing modules are also conceivable.

With regard to the contact surfaces, there are provided preferably 4 to 20, in particular 5 to 16 contact surfaces on a connecting side of a fluid housing module. A fluid housing module that has two connecting sides consequently has 4 to 20, in particular 5 to 16 contact surfaces respectively on both connecting sides. Fluid housing modules can also have a first connecting side, which is configured according to the invention and thus has 4 to 20 contact surfaces, and a second connecting side configured according to the prior art. Such a fluid housing module is downwardly compatible. The second connecting side is formed here for planar, in particular full-surface contact on the adjacent fluid housing module.

According to one variant, all fluid connections are arranged on one side of the fluid housing. These are thereby easily accessible. Moreover, it is thus possible to arrange the fluid housing in very restricted installation spaces, as only accessibility from a single side must be ensured.

There is optionally provided on the side opposite the fluid connections on each fluid housing module a mounting, by means of which the related fluid housing module can be fastened in a machine or facility. This is preferably a mounting for a top-hat rail, wherein other rail forms are of course also possible.

The adjacent fluid housing modules can be positioned in relation to one another exclusively via the contact surfaces. The above-named advantages regarding the precise positioning of the fluid housing modules in relation to one another and the good sealing of the fluid housing modules against one another then apply to an especially high degree. Such fluid housing modules are likewise particularly easy to manufacture.

The adjacent fluid housing modules can also be positioned in relation to one another only via the contact surfaces in the alignment direction. The positioning transverse to the alignment direction is then effected via other positioning elements, for example via pins or pegs on one of the fluid housing modules, which engage in openings on the adjacent fluid housing module.

According to an embodiment, the fluid housing comprises a second central fluid duct, which is separate from the first central fluid duct and extends substantially along the alignment direction and is formed by second central fluid duct sections of the adjoining fluid housing modules, wherein on each of the fluid housing modules, at least one fluid connection is provided, which is connected fluidically to the second central fluid duct via a respectively assigned lateral fluid duct. The second central fluid duct thus runs substantially parallel to the first central fluid duct. Both central fluid ducts are formed in the same manner here by central fluid duct sections. In the event that the fluid housing is used in a varnishing facility, during operation of the varnishing facility one of the central fluid ducts can be flushed out, while the other is used for varnishing a workpiece. Particularly economical operation of the varnishing facility thus results. In other applications the two central fluid ducts can also be operated in parallel. The fluid housing can thus be used universally in various application fields.

On each fluid housing module, two fluid connections can be provided, which are connected fluidically to the first central fluid duct via a respectively assigned lateral fluid duct and/or, on each fluid housing module, two fluid connections can be provided, which are connected fluidically to the second central fluid duct via a respectively assigned lateral fluid duct. A pair of fluid connections is thus provided for each central fluid duct in each fluid housing module. Depending on the use of the fluid housing, one of the fluid connections can be a fluid outlet and the other a fluid inlet. It is also possible that the pair is formed by two fluid outlets or two fluid inlets. Fluid housing modules with different characteristics in terms of the fluid connections can also be used in the fluid housing. The fluid housing can thus be adapted simply and flexibly to different applications.

In this variant all the fluid connections are also preferably arranged on one side of the fluid housing. As already described, a mounting for attachment can then be provided on the opposite side. Reference is made to the above statements with regard to this.

Adjacent central fluid duct sections forming the first central fluid duct and/or adjacent central fluid duct sections forming the second central fluid duct are preferably each connected fluidically to one another via a sealing component. A sealing component thus always lies between two adjacent fluid housing modules for each of the central fluid ducts. The sealing component is an O-ring, for example. The respectively assigned central fluid duct is thus sealed simply and reliably with respect to an environment. Due to the fact that adjacent fluid housing modules are positioned against one another only via the contact surfaces, the contact surfaces are preferably adjusted in respect of their geometry such that, in a contact position the sealing component lying respectively between the fluid housing modules in question is compressed in a defined manner. The central duct can thus be permanently sealed with respect to the environment.

The fluid housing modules are advantageously manufactured from a plastic, in particular wherein the fluid housing modules are plastic injection-moulded parts. Fluid housing modules of plastic have been proven in the prior art. They can be manufactured easily and cheaply. The injection moulding process is particularly well suited to this.

Due to the fact that the fluid housing modules fit together only via the contact surfaces, it is now sufficient to subject the contact surfaces to fine machining or to manufacture a production tool, in particular an injection mould, only at the points corresponding to the contact surfaces adhering to close tolerances. Compared with the prior art, in which fine machining of a complete connecting side of a fluid housing module is always required, effort and costs can thus be saved.

The fluid housing modules are preferably configured here specifically for plastic. For this they have substantially uniform wall thicknesses. Moreover, no or only comparatively few material accumulations are present. Not only is the manufacture of dimensionally accurate fluid housings guaranteed by such a configuration, but material is also saved overall. This is the case in particular compared with fluid housings worked from the full blank.

In other words, recesses are provided here in the fluid housing modules at least in the alignment direction. These make it possible to provide constant wall thicknesses at least in the region of the fluid ducts and other functional surfaces.

According to a variant, a valve is arranged in each of the lateral fluid ducts, by means of which valve the fluid connection assigned to the respective lateral fluid duct can be selectively connected fluidically to the assigned central fluid duct or can be separated fluidically therefrom. An assigned valve holder, which is arranged in the fluid housing module, is preferably formed such that different valves can be received. The fluid housing module is thus modular in respect of the valves. For example, pneumatically actuated 2/2-way valves can be installed in a fluid housing module.

Valve holders in which no valve is mounted can optionally also be used for pressure and/or temperature sensors. The valve holders thus represent a simple possibility for mounting sensors on the fluid housing.

Embodiments can be provided in which the valves allow so-called circulation. This means that, regardless of the position of the valve, the fluid provided via the lateral fluid duct can flow back, i.e. in the direction of its source, through a duct provided in the valve. This is necessary in particular in application fields in which a hold-up of the fluid must be avoided, for example in varnishing facilities, in food processing, in fertilizer manufacture and/or in the production of detergents. In the production or processing of fruit juices, the settling of fruit pulp, for example, is prevented in this way.

A circulation duct can be assigned to one or more of the lateral fluid ducts respectively, which circulation duct is provided in the assigned fluid housing module and opens into a fluid circulation connection, wherein the circulation duct is connected fluidically to the assigned lateral fluid duct, even if the valve separates the lateral fluid duct fluidically from the assigned central fluid duct. As already mentioned, a fluid housing module having a circulation duct can be formed such that it can receive different valve types. In this context it is possible in particular to use a valve that does not allow any circulation. Then the circulation duct is not used. All the fluid connections are again preferably arranged on one side of the fluid housing.

In the event that several valves are provided inside a fluid housing module, so-called overflow ducts can also be provided instead of or in addition to the circulation ducts. Overflow ducts connect at least two valves fluidically to one another. In the event that one of the valves separates the assigned lateral fluid duct from the assigned central fluid duct, the fluid provided via this lateral fluid duct is therefore conducted through the overflow duct to the respectively other valve and from there can be introduced into the central fluid duct and flow back in the direction of its source either via the lateral fluid duct belonging to the second valve or via a circulation duct. The requirement to avoid a hold-up of the fluid can be reliably implemented in this way also.

The contact surfaces are preferably spaced apart from one another and arranged distributed along, i.e. over a connecting side of the assigned fluid housing module. A connecting side of a fluid housing module is the side that lies opposite an adjacent fluid housing module. A fluid housing module that is arranged between two other fluid housing modules therefore has two opposed connecting sides. The already-mentioned configuration of the fluid housing module specifically for plastic is favoured by the fact that the contact surfaces are spaced apart from one another. Material accumulations can namely thus be avoided. Moreover, a reliable and defined contact of adjacent fluid housing modules is guaranteed by a distribution of the contact surfaces. In particular, the contact surfaces are distributed here in such a way that a tilting of adjacent fluid housing modules towards one another is effectively avoided. This serves the tightness of the central fluid duct with respect to the environment and the dimensionally accurate positioning of adjacent fluid housing modules in relation to one another.

One of the contact surfaces can be a section of the front end, oriented in the alignment direction, of a wall of one of the central fluid duct sections. The contact surface is thus a front end of one of the first central fluid duct sections or a front end of one of the second central fluid duct sections. The contact surface is an annular surface here or a part thereof and at least partially encloses the assigned central fluid duct. The contact surface is preferably a closed annular surface. Further preferably the contact surface encloses the sealing component assigned to the respective central fluid duct section. It is thus arranged around the sealing component. By the contact surface coming into contact with an assigned mating surface, the sealing component is consequently compressed in a defined manner and thus guarantees a reliable sealing of the respective central fluid duct with respect to the environment.

Alternatively or in addition, one or more of the contact surfaces can be end faces, oriented in the alignment direction, of wall sections, which are each thickened compared with the other walls of the fluid housing module, in particular wherein the thickened wall sections extend in the alignment direction over at least 25% of a length of the assigned fluid housing module in the alignment direction. The thickened wall sections and their extent lead here to high contact forces being able to be introduced into the contact surfaces and introduced into the other components of the fluid housing module. This is necessary in particular if a sealing component lying between two adjacent fluid housing modules is to be compressed with high forces. Moreover, such an embodiment of the fluid housing module is mechanically particularly robust and durable.

In an alternative at least one of the contact surfaces is positioned in an edge region of a connecting side of the assigned fluid housing module. Such a contact surface is thus comparatively remote from a central fluid duct inside the fluid housing module. In particular, a relative tilting of adjacent fluid housing modules about an axis transverse to a central axis of the central fluid duct is effectively avoided. This also serves the reliable sealing of the central fluid duct with respect to the environment.

Against this background the contact surfaces can be divided into two groups. A first group here comprises all the contact surfaces that serve the defined compression of the sealing component, thus overall the sealing of the central fluid duct with respect to the environment. These are preferably arranged in the region of the central fluid duct. A second group serves to position adjacent fluid housing modules in relation to one another. In alternative embodiments it is of course also possible that each of the contact surfaces carries out both functions, thus is to be assigned to both the first and the second group.

An embodiment provides that a surface area of the contact surfaces decreases substantially with a distance from the first central fluid duct and/or from the second central fluid duct. Contact surfaces formed in such a way bring about a distribution of the contact pressure by means of which the two adjacent fluid housing modules are held together. This contact pressure can be distributed along, i.e. over the cross section of the fluid housing modules by the surface areas of individual contact surfaces. With the configuration of the surface areas described above, the contact pressure can thus be divided into a first portion, which serves to compress the sealing component, and a second portion, which is provided for the secure contact and thus the secure positioning of the fluid housing modules in relation to one another. A particularly tight and positionally accurate connection of adjacent fluid housing modules can thus be achieved.

Fluid housing modules arranged adjacent to one another are preferably connected to one another via a coupling device and the coupling device comprises at least two coupling units, wherein the coupling units are arranged in a direction transverse to the alignment direction on opposite sides of the central fluid duct, in particular wherein the coupling units in pairs are respectively equidistant from a central axis of the central fluid duct. The coupling devices are thus arranged preferably symmetrically with regard to the central axis of the central fluid duct. This guarantees a uniform distribution of the contact pressure and thus a high degree of tightness of the central fluid duct with respect to the environment. Adjacent fluid housing modules are connected to one another here in particular under tension. This means that a contact pressure is exerted via the coupling device by one fluid housing module on the adjacent fluid housing module. This contact pressure serves in particular the defined compression of the sealing component.

Adjacent fluid housing modules can also be positioned in relation to one another via the coupling device in a direction transverse to the alignment direction. The term "centring of the adjacent fluid housing modules" is also used in this context. On the at least two coupling units, centring surfaces are provided, which fit together in the coupled state of the fluid housing modules.

In this context a coupling unit can comprise a tie rod, for example, thus a bar-like extension protruding from one of the fluid housing modules, which is attached with so-called taper pins in one of the adjacent fluid housing modules. For this purpose, the extension is taken up in a corresponding opening. In an optional case, in which the adjacent fluid housing modules are centred via the coupling unit, a shell surface of the extension and a shell surface of the assigned opening can be formed as centring surfaces, which fit together in the coupled state of the fluid housing modules.

The coupling devices are formed in particular in such a way that in the case in which the fluid housing is composed of more than two fluid housing modules, individual fluid housing modules can be separated without loosening or otherwise influencing the connection between the other fluid housing modules.

One of the contact surfaces can then run substantially annularly around one of the coupling units. Since the contact pressure acting between adjacent fluid housing modules originates from the coupling unit, this pressure can thus be conducted directly into the adjacent fluid housing module. Moreover, by having a spacing between a coupling unit and a contact surface that is as small as possible, it is avoided that torques are introduced into the fluid housing by the coupling unit. It is also thus avoided that the fluid housing twists geometrically due to forces introduced by the coupling unit.

In the region of the coupling device the thickened wall sections preferably run in the alignment direction continuously over the entire extent of the fluid housing module. Particularly high contact pressures can thereby be introduced into the fluid housing.

The object is further achieved by a fluid collection or distribution system with a fluid housing according to the invention. Such a fluid collection or fluid distribution system can thus be manufactured simply and cheaply. Moreover, an assigned central fluid duct has a high degree of tightness with respect to an environment.

DETAILED DESCRIPTION

Figure 1:
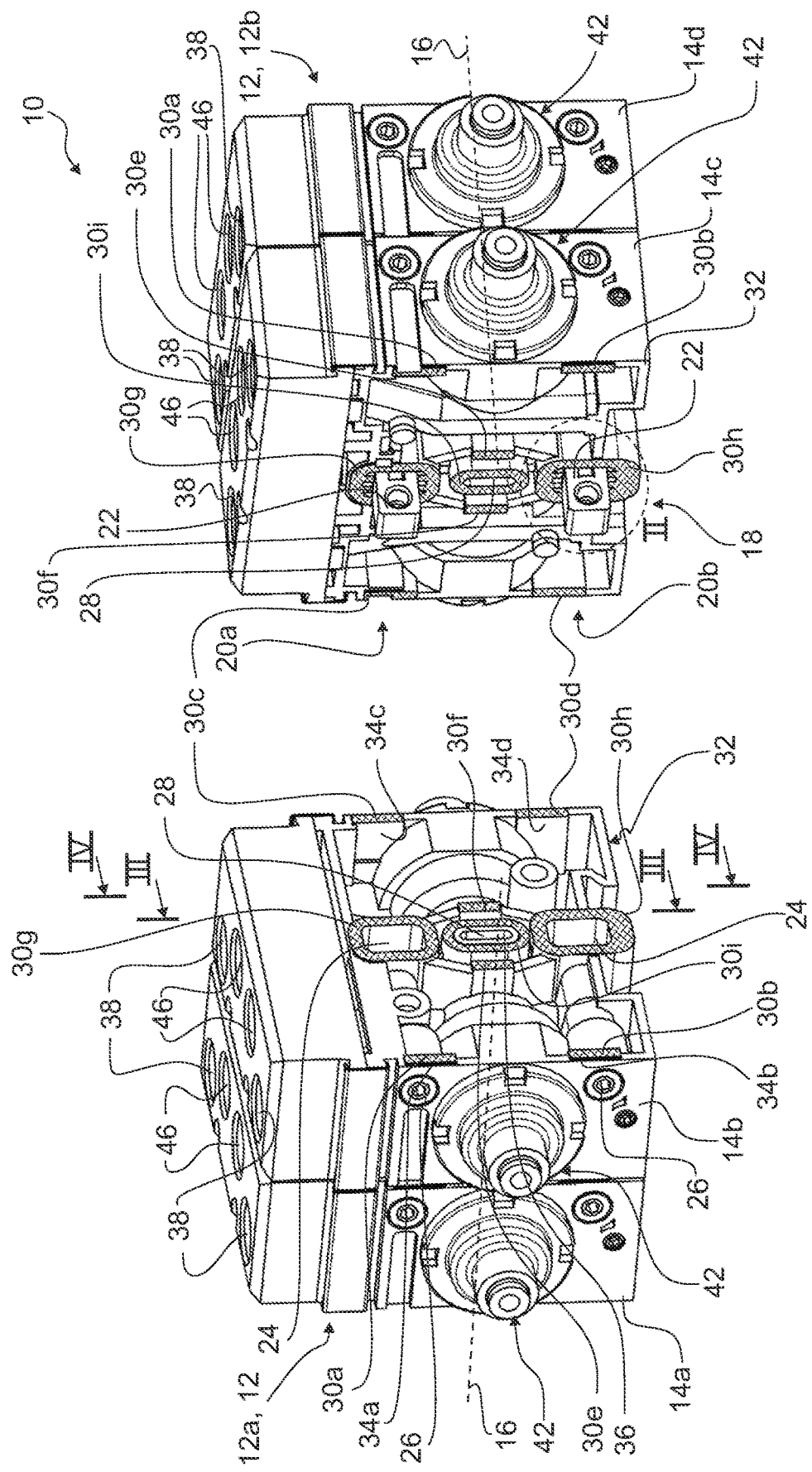
FIG. 1 a fluid collection or fluid distribution system according to the invention with a fluid housing according to the invention according to a first embodiment, wherein the fluid housing is represented in two pieces separate from one another, FIG. 2 a detail II of the fluid collection or fluid distribution system from FIG. 1, FIG. 3 a section III-Ill through the fluid collection or fluid distribution system from FIG. 1, FIG. 4 a section IV-IV through the fluid collection or fluid distribution system from FIG. 1, FIG. 5 a circuit diagram belonging to the fluid collection or fluid distribution system from FIG. 1 in which two fluid housing modules are to be seen, FIG. 6 a fluid collection or fluid distribution system according to the invention with a fluid housing according to the invention according to a second embodiment, FIG. 7 a section VII-VII through the fluid collection or fluid distribution system from FIG. 6 and FIG. 8 a circuit diagram belonging to the fluid collection or fluid distribution system from FIG. 6 in which only one fluid housing module is to be seen.
Figure 2:
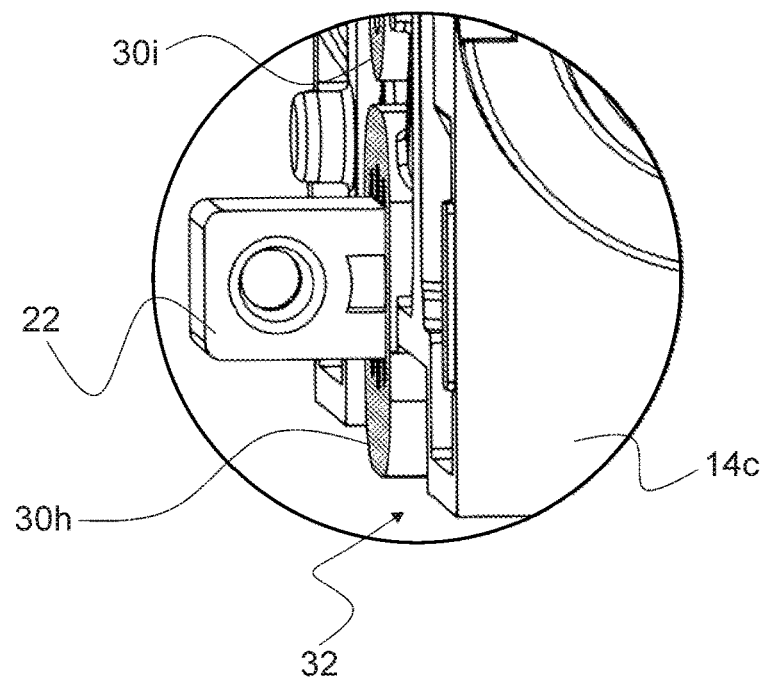
Figure 3:
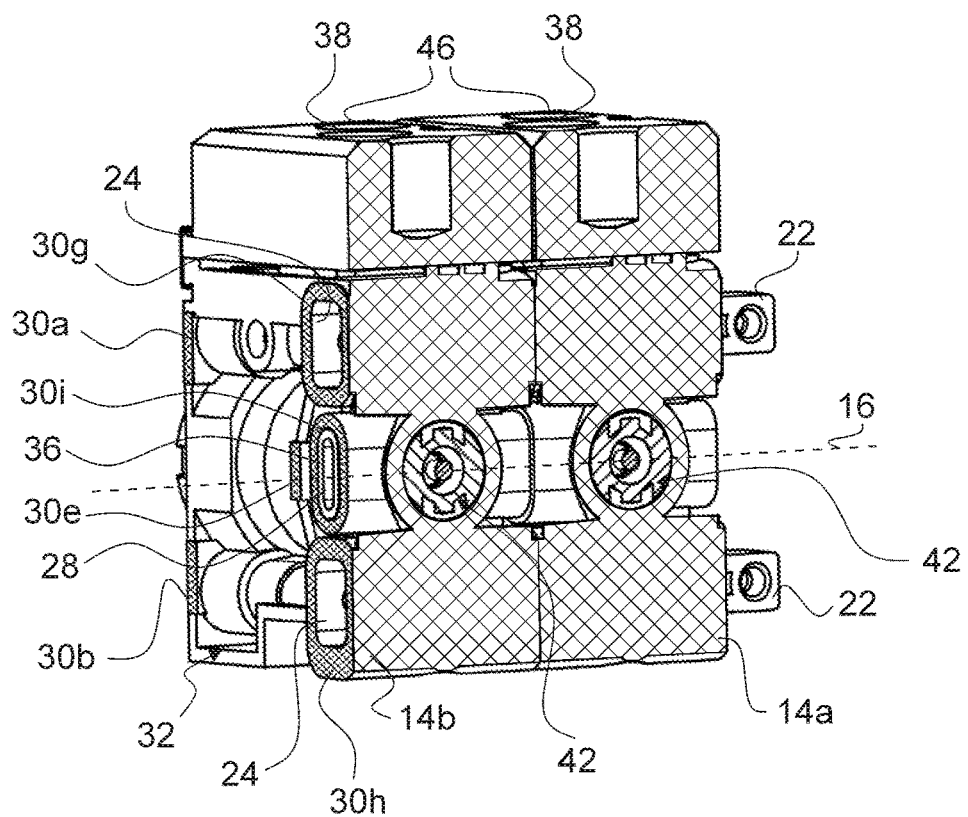
Figure 4:
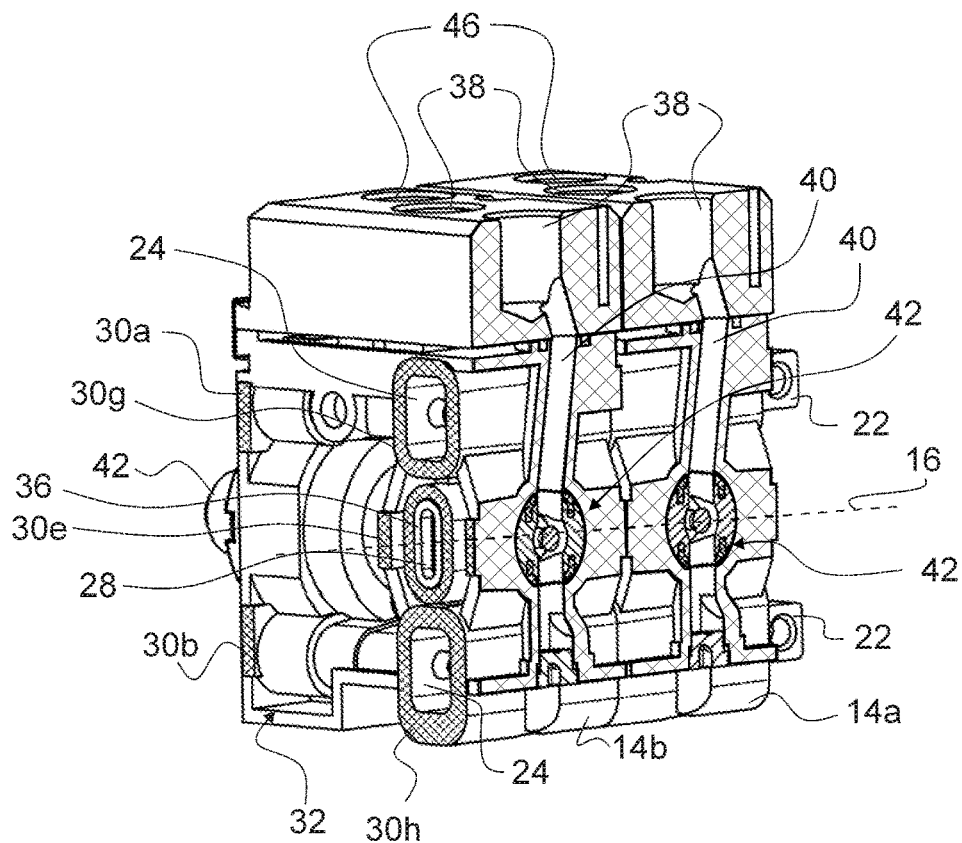

FIGS. 1 to 5 show a fluid collection system 10 with a fluid housing 12 according to a first embodiment. Here the fluid housing 12 is represented in two pieces 12*a*, 12*b* separate from one another. This serves purely for illustration. In the functional state, the two pieces 12*a*, 12*b* of the fluid housing 12 shown in FIG. 1 are of course coupled to one another.

The fluid housing 12 comprises four fluid housing modules 14*a*, 14*b*, 14*c* and 14*d*, which are arranged adjoining one another along an alignment direction 16. The fluid housing modules 14*b* and 14*c* are represented here in the decoupled state.

The fluid housing modules 14*a* and 14*b* as well as 14*c* and 14*d* are connected to one another via a coupling device 18, which is to be seen only in the region between the fluid housing modules 14*b* and 14*c*. The coupling device 18 here comprises two coupling units 20*a*, 20*b*.

Each of the coupling units 20*a*, 20*b* has on one of the fluid housing modules 14*a*-14*d* to be connected, in the present case on the fluid housing module 14*c*, a coupling extension 22, which is also called a tie rod. In the coupled state of the fluid housing modules 14*a*-14*d* this engages in a coupling opening 24 arranged on the respectively opposite fluid housing module 14*a*-14*d*, in the present case on the fluid housing module 14*b*. The coupling extension 22 is fixed therein by means of a fastening screw 26. The fastening screw 26 can have wedge- and/or cone-shaped sections, via which a contact pressure acting in the alignment direction 16 can be introduced into the coupling extension 22.

The two coupling units 20*a*, 20*b* are arranged in a direction transverse to the alignment direction 16 on opposite sides of a first central fluid duct 28.

In the embodiment represented, the coupling units 20*a*, 20*b* are moreover positioned equidistant from a central axis of the first central fluid duct 28, i.e. they are arranged symmetrically with regard to the central fluid duct 28.

In the first embodiment example represented, there are provided on each of the fluid housing modules 14*a* to 14*d* nine contact surfaces 30a to 30i, which protrude with respect to an assigned fluid housing module basic body along the alignment direction 16.

In other words, the contact surfaces 30a to 30i are raised with respect to an assigned fluid housing module basic body.

Adjacent fluid housing modules 14a to 14d are positioned in relation to one another here exclusively via the contact surfaces 30a to 30i. They thus rest on one another exclusively via the contact surfaces 30a to 30i and optionally via a sealing component.

The contact surfaces 30a to 30i are spaced apart from one another and arranged distributed over, i.e. along a connecting side 32 of the assigned fluid housing module 14a to 14d. The connecting side 32 of a fluid housing module 14a to 14d here is the side that lies opposite an adjacent fluid housing module 14a to 14d. A fluid housing module 14a to 14d, which is arranged between two fluid housing modules 14a to 14d, thus has two connecting sides 32.

The contact surfaces 30a to 30d are positioned here in an edge region of the connecting side 32 of the assigned fluid housing module 14a to 14d. The contact surfaces 30a to 30d are here realized as end surfaces of wall sections 34a to 34d, which are each thickened compared with the other walls of the fluid housing module 14a to 14d.

However, the thickened wall sections 34a to 34d are not continuous along the alignment direction 16 over an entire length of the assigned fluid housing module 14a to 14d, but extend only over at least 25% of this length.

The contact surfaces 30e and 30f are arranged in the region of the first central fluid duct 28, but are spaced apart therefrom.

The contact surfaces 30g and 30h run substantially annularly around one of the coupling units 20a, 20b. In the embodiment example represented, the two contact surfaces 30g, 30h run annularly around the coupling openings 24 and the coupling extensions 22.

The contact surface 30i is formed by a section of a front end, oriented in the alignment direction 16, of a wall of the first central fluid duct 28. The contact surface 30i thus runs annularly around the central fluid duct 28.

As can be recognized on the basis of an overall observation of all the contact surfaces 30a to 30i, a surface area of the contact surfaces 30a to 30i decreases substantially with a distance from the first central fluid duct 28.

The first central fluid duct 28 is formed here by first central fluid duct sections of the adjoining fluid housing modules 14a to 14d.

The central fluid duct 28 is thus created only by aligning the fluid housing modules 14a to 14d along the alignment direction 16. In this case adjacent first central fluid duct sections forming the first central fluid duct 28 are each connected fluidically to one another via a sealing component 36.

Figure 5:
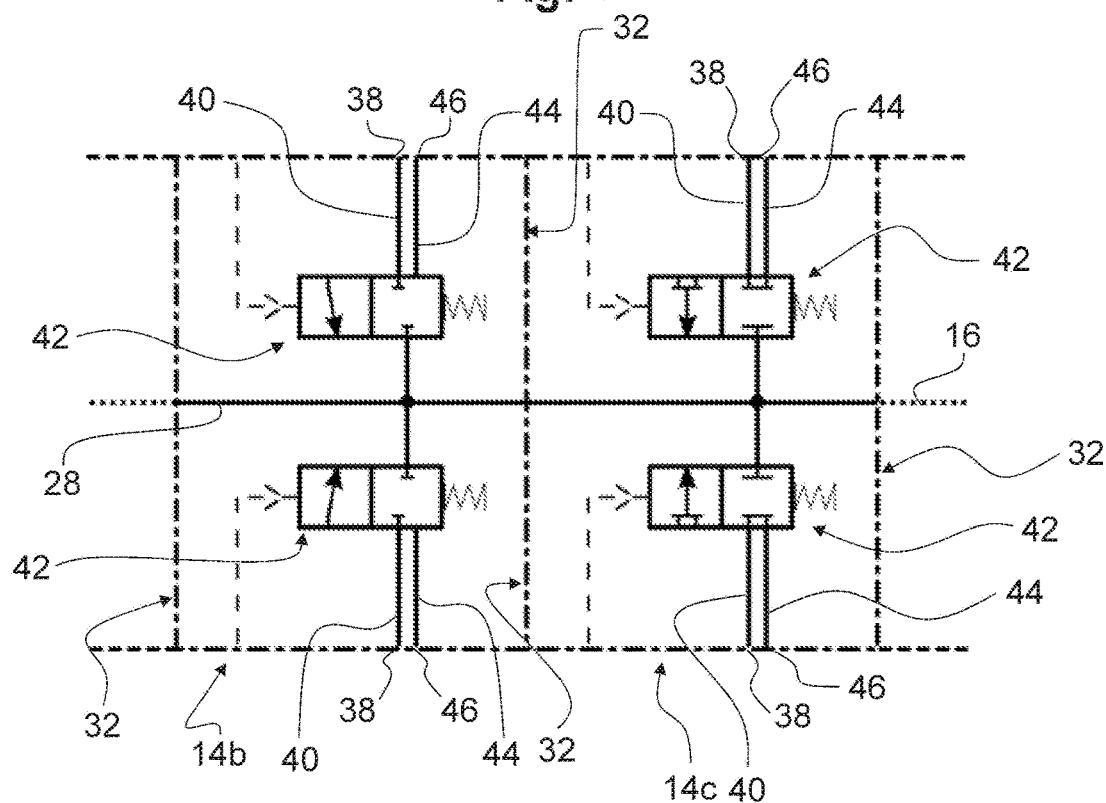

On each of the fluid housing modules 14a to 14d at least one fluid connection 38 is provided, which is connected fluidically to the first central fluid duct 28 via a respectively assigned lateral fluid duct 40 (see FIG. 5).

In the first embodiment, each fluid housing module 14a to 14d comprises two fluid connections 38 and thus also two lateral fluid ducts 40 respectively connected to these. Both lateral fluid ducts 40 are connected fluidically to the first central fluid duct 28.

Moreover, in each of the lateral fluid ducts 40 a valve 42 is arranged, by means of which the fluid connection 38 assigned to the respective lateral fluid duct 40 can selectively be connected fluidically to the central fluid duct 28 or separated fluidically therefrom.

As can further be recognized from FIG. 5, in the embodiment represented, there is assigned to each of the lateral fluid ducts 40 a circulation duct 44 which opens into an assigned fluid circulation connection 46.

The circulation ducts 44 are necessary in applications in which the fluid must not be held up. In such applications a flow path must be provided through which fluid which flows into the lateral fluid duct 40 via the fluid connection 38, can circulate, thus flow back, in the direction of its source. This must be guaranteed in particular if the valve 42 separates the lateral fluid duct 40 from the first central fluid duct 28.

To provide this functionality, a corresponding valve 42 must also be used.

The fluid housing module 14b, which is represented on the left in FIG. 5, has in this context a valve 42 with which no circulation through the circulation duct 44 can be made possible. The fluid flowing in via the lateral fluid duct 40 thus comes to a stop therein if the lateral fluid duct 40 is separated from the first central fluid duct 28 by the valve 42.

The fluid housing module 14c, which is represented on the right in FIG. 5, is identical to the fluid housing module 14b, but a different valve 42 is fitted.

In a position in which it separates the lateral fluid duct 40 from the first central fluid duct 28, this makes possible a fluidic connection of the lateral fluid duct 40 to the circulation duct 44. Thus a fluid flowing in via the lateral fluid duct 40, for example, does not come to a stop or is not held up. Even in a valve position in which the valve 42 connects the lateral fluid duct 40 fluidically to the central fluid duct 28, a fluidic connection is produced between the lateral fluid duct 40 and the circulation duct 44, with the result that even in this state the fluid present in the circulation duct 44 does not come to a stop or is not held up.

Figure 6:
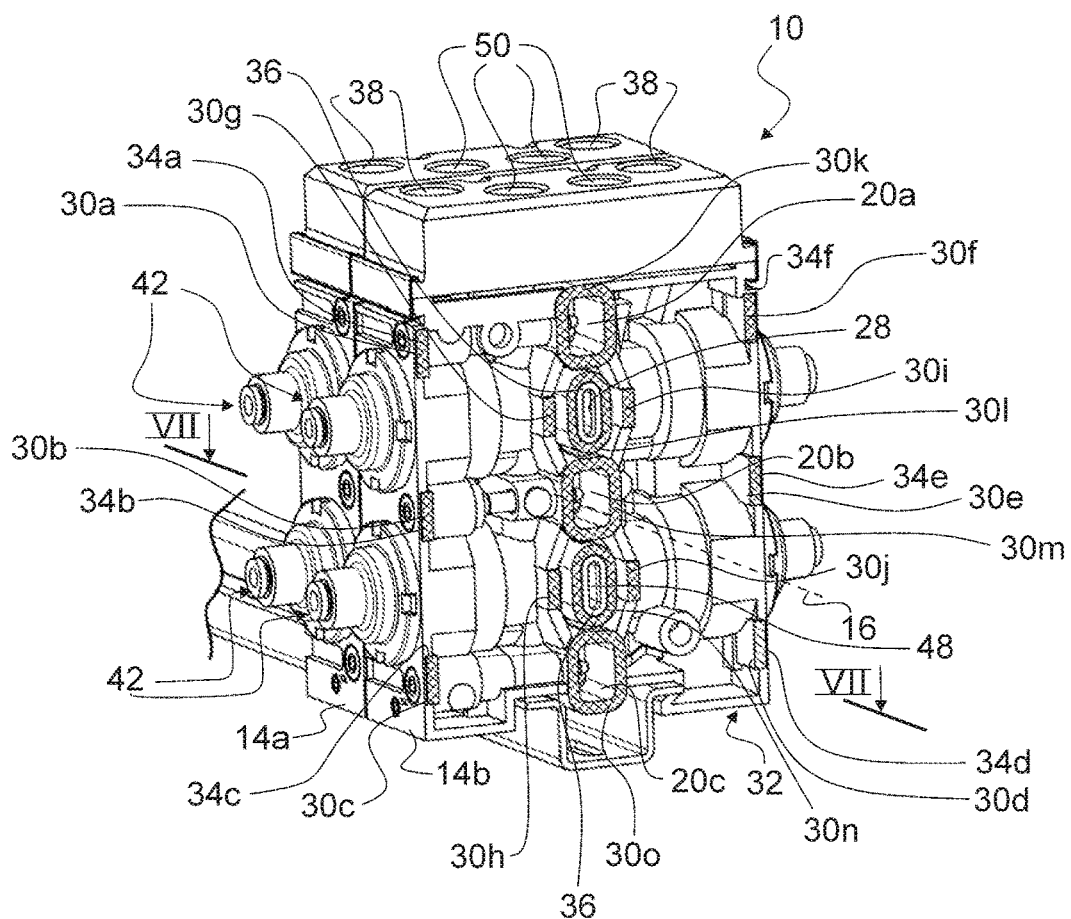
Figure 7:
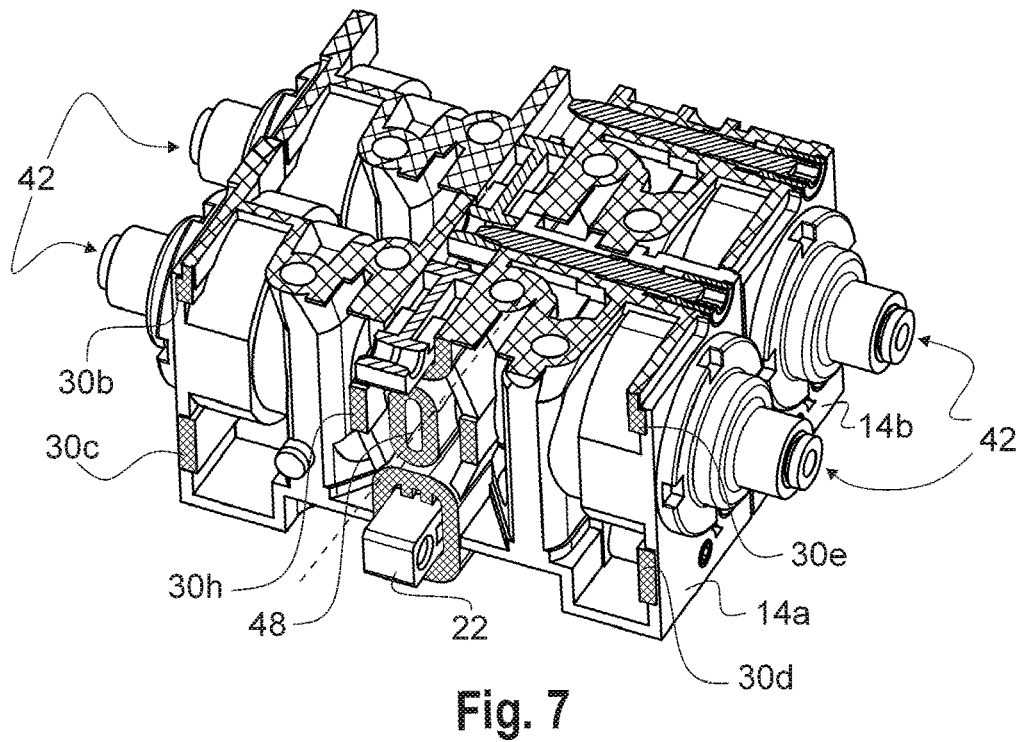
Figure 8:
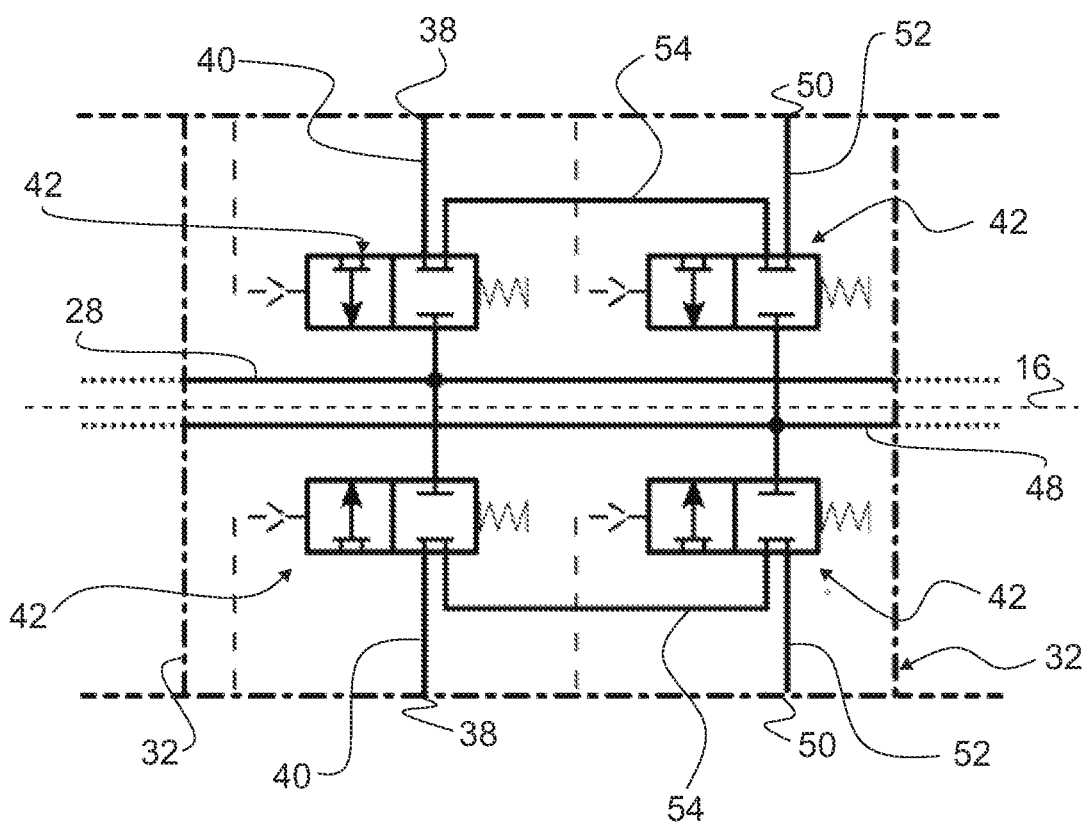

In FIGS. 6 to 8, a second embodiment of the fluid collection system 10 is represented. Only the differences from the first embodiment are considered in the following.

The fluid collection system 10 of the second embodiment differs significantly from the fluid collection system 10 of the first embodiment in that next to the first central fluid duct 28 a second central fluid duct 48 is provided. This is separate from the first central fluid duct 28 and extends likewise along the alignment direction 16.

The first central fluid duct 28 and the second central fluid duct 48 thus run substantially parallel.

The second central fluid duct 48 is also formed here by central fluid duct sections of the adjoining fluid housing modules 14a, 14b.

Moreover, the fluid collection system 10 now has three coupling units 20a to 20c, instead of just two.

The coupling units 20a to 20c are arranged as a whole on a line that runs transverse to the alignment direction 16.

They are also positioned in pairs equidistant from a central axis of the first central fluid duct 28 or equidistant from a central axis of the second central fluid duct 48. The respective pairs are thus arranged symmetrically either to the first central fluid duct 28 or to the second central fluid duct 48.

With regard to the fluid connections, in addition to the two fluid connections 38, which are connected fluidically to the first central fluid duct 28 via the respectively assigned lateral fluid duct 40, the fluid collection system 10 according to the second embodiment also has two fluid connections 50, which are connected fluidically to the second central fluid duct 48 via a respectively assigned lateral fluid duct 52 (see FIG. 8).

The central fluid duct sections forming the second central fluid duct 48 are also connected to one another via a sealing component 36. In the second embodiment two sealing components 36 are thus provided.

In the fluid housing modules 14a, 14b according to the second embodiment, the same valves 42 are used in the example represented as are also used in the fluid housing modules 14a to 14d from FIG. 5.

However, no circulation ducts are now provided, but rather so-called overflow ducts 54.

In a state in which the valves 42 separate the fluid connection 38 and/or the fluid connection 50 from the first central fluid duct 28 or from the second central fluid duct 48, the assigned lateral fluid ducts 40 and 52 can be connected fluidically to one another by means of the overflow ducts 54, with the result that the fluid present is not held up.

Even in a position of the valves 42 in which the lateral fluid ducts 40 and/or the lateral fluid ducts 52 are connected to the respectively assigned central fluid duct 28, 48, the flow path via the overflow ducts 54 is open. Thus a hold-up of the fluid does not occur even in this state.

Variants are of course also conceivable in which circulation ducts are provided alternatively or in addition to the overflow ducts 54 in the fluid housing according to the second embodiment according to the embodiment example shown in FIG. 5.

With regard to the contact surfaces, 15 contact surfaces 30a to 30o are now provided.

Here the contact surfaces 30a to 30f are each positioned in an edge region of the connecting side 32 of the assigned fluid housing module 14a, 14b. They are formed substantially exactly like the contact surfaces 30a to 30d of the first embodiment, thus realized as end surfaces of wall sections 34a to 34f, which are each thickened compared with the other walls of the fluid housing module 14a, 14b.

The contact surfaces 30k, 30m and 30o are annular and run around one of the coupling units 20a to 20c.

The contact surface 30l further runs around the first central fluid duct 28 and the contact surface 30n around the second central fluid duct 48.

In the second embodiment also the contact surfaces 30a to 30o are formed such that a surface area of the contact surfaces 30a to 30o decreases substantially with a distance from the first central fluid duct 28 and/or from the second central fluid duct 48.

The fluid housing 12, more precisely the fluid housing modules 14a to 14d, are manufactured from a plastic in both embodiments. In the present case the fluid housing modules 14a to 14d are plastic injection-moulded parts.

The above embodiment examples were explained by means of a fluid collection system. However, this is not to be understood restrictively. The above explanations also apply in analogous form to fluid distribution systems.

The invention claimed is:

1. A fluid housing for a fluid collection system or a fluid distribution system, with
   at least two fluid housing modules adjoining one another along an alignment direction and
   a first central fluid duct, which extends along the alignment direction and is formed by first central fluid duct sections of the adjoining fluid housing modules,
   wherein on each fluid housing module at least one fluid connection is provided, which is connected fluidically to the first central fluid duct via a respectively assigned lateral fluid duct,
   wherein
   on each of the fluid housing modules at least two contact surfaces are provided, which protrude with respect to an assigned fluid housing module basic body along the alignment direction and adjacent fluid housing modules are positioned in relation to one another via the contact surfaces.

2. The fluid housing according to claim 1, wherein adjacent fluid housing modules are positioned in relation to one another exclusively via the contact surfaces.

3. The fluid housing according to claim 1, wherein adjacent fluid housing modules are positioned in relation to one another in the alignment direction via the contact surfaces.

4. The fluid housing according to claim 1, including a second central fluid duct, which is separate from the first central fluid duct, extends along the alignment direction and is formed by second central fluid duct sections of the adjoining fluid housing modules, wherein on each of the fluid housing modules at least one fluid connection is provided, which is connected fluidically to the second central fluid duct via a respectively assigned lateral fluid duct.

5. The fluid housing according to claim 1, wherein on each fluid housing module two fluid connections are provided, which are connected fluidically to the first central fluid duct via a respectively assigned lateral fluid duct.

6. The fluid housing according to claim 4, wherein on each fluid housing module two fluid connections are provided, which are connected fluidically to the second central fluid duct via a respectively assigned lateral fluid duct.

7. The fluid housing according to claim 4, wherein at least one of adjacent central fluid duct sections forming the first central fluid duct and of adjacent central fluid duct sections forming the second central fluid duct are each connected to one another fluidically via a sealing component.

8. The fluid housing according to claim 1, wherein the fluid housing modules are manufactured from plastics.

9. The fluid housing according to claim 1, wherein in each of the lateral fluid ducts a valve is arranged, by means of which the fluid connection assigned to the respective lateral fluid duct can selectively be connected fluidically to the assigned central fluid duct or separated fluidically therefrom.

10. The fluid housing according to claim 1, wherein the contact surfaces are spaced apart from one another and are arranged distributed along a connecting side of the assigned fluid housing module.

11. The fluid housing according to claim 1, wherein one of the contact surfaces is a section of the front end, oriented in the alignment direction, of a wall of one of the central fluid duct sections.

12. The fluid housing according to claim 1, wherein at least one of the contact surfaces are end surfaces of wall sections which are each thickened compared with the other walls of the fluid housing module, the end surfaces being oriented in the alignment direction.

13. The fluid housing according to claim 12, wherein the thickened wall sections extend in the alignment direction over at least 25% of a length of the assigned fluid housing module in the alignment direction.

14. The fluid housing according to claim 1, wherein at least one of the contact surfaces is positioned in an edge region of a connecting side of the assigned fluid housing module.

15. The fluid housing according to claim 4, wherein a surface area of the contact surfaces decreases with a distance from at least one of the first central fluid duct and the second central fluid duct.

16. The fluid housing according to claim 1, wherein adjacently-arranged fluid housing modules are connected to one another via a coupling device and the coupling device comprises at least two coupling units, wherein the coupling units are arranged in a direction transverse to the alignment direction on opposite sides of the central fluid duct.

17. The fluid housing according to claim 16, wherein the coupling units in pairs are respectively equidistant from a central axis of the central fluid duct.

18. The fluid housing according to claim 16, wherein one of the contact surfaces respectively runs annularly around one of the coupling units.

19. A fluid collection system or fluid distribution system with the fluid housing according to claim 1.

* * * * *